(12) United States Patent
Redford et al.

(10) Patent No.: US 11,685,103 B2
(45) Date of Patent: Jun. 27, 2023

(54) PRESSURE FORMING MACHINE

(71) Applicant: Mayku LTD, London (GB)

(72) Inventors: Benjamin W R Redford, London (GB); William B. DeBrett, London (GB)

(73) Assignee: Mayku Ltd, London (GB)

(\*) Notice: Subject to any disclaimer, the term of this patent is extended or adjusted under 35 U.S.C. 154(b) by 0 days.

(21) Appl. No.: 17/238,857

(22) Filed: Apr. 23, 2021

(65) Prior Publication Data
US 2022/0339851 A1 Oct. 27, 2022

(51) Int. Cl.
*B29C 51/10* (2006.01)
*B29C 51/30* (2006.01)
*B29C 51/38* (2006.01)
*B29C 51/42* (2006.01)

(52) U.S. Cl.
CPC ............ *B29C 51/10* (2013.01); *B29C 51/303* (2013.01); *B29C 51/38* (2013.01); *B29C 51/42* (2013.01)

(58) Field of Classification Search
CPC ....... B29C 51/303; B29C 51/38; B29C 51/42; B29C 51/10
See application file for complete search history.

(56) References Cited

U.S. PATENT DOCUMENTS

| 2,111,857 A | 3/1938 | Jeffery |
| 2,690,593 A | 10/1954 | Abercrombie |
| D193,112 S | 6/1962 | Morse |
| D204,416 S | 4/1966 | Amendolia |
| D208,496 S | 9/1967 | Kreitz |
| 3,501,886 A | 3/1970 | Watts, Jr. et al. |
| 3,528,132 A | 9/1970 | Greenberg et al. |
| 3,682,571 A | 8/1972 | Greenberg et al. |
| D225,897 S | 1/1973 | Jenkins |
| 3,768,164 A | 10/1973 | Breads |
| 4,047,870 A | 9/1977 | Smaldone |
| D274,254 S | 6/1984 | Jenkins |

(Continued)

FOREIGN PATENT DOCUMENTS

| CN | 203805300 U | 9/2014 |
| CN | 207549434 U | 6/2018 |

(Continued)

OTHER PUBLICATIONS

Erkopress 240; Jireh Trading product purchase webpage; downloaded from the Internet at https://www.jirehtrading.com/products/erkopress-240 on Nov. 9, 2021; 3 pages.

(Continued)

*Primary Examiner* — Monica A Huson
(74) *Attorney, Agent, or Firm* — Crowell & Moring LLP

(57) ABSTRACT

A pressure forming machine is provided. In one embodiment, the pressure forming machine integrates a heater in its pressure chamber, so the heater and pressure chamber are movable together with respect to a base of the pressure forming machine. The pressure chamber and base can contain locking mechanisms to create a seal between the pressure chamber and a plastic sheet used for forming. The base can also contain a separable air compressor component, so the air compressor can be physically distanced to reduce the noise experienced by a user. Other embodiments are provided.

18 Claims, 22 Drawing Sheets

(56) References Cited

U.S. PATENT DOCUMENTS

| | | | |
|---|---|---|---|
| D328,750 S | 8/1992 | Chou | |
| 5,829,980 A | 11/1998 | Sheridan et al. | |
| 6,257,866 B1 * | 7/2001 | Fritz | B29C 51/10 |
| | | | 425/388 |
| D532,431 S | 11/2006 | Kreuzer | |
| D593,586 S | 6/2009 | Hashimoto | |
| D658,694 S | 5/2012 | Day | |
| 8,882,497 B2 | 11/2014 | Frantz et al. | |
| D854,061 S | 7/2019 | Huang | |
| D875,148 S | 2/2020 | Galkin | |
| D935,494 S | 11/2021 | Chen | |
| D939,002 S | 12/2021 | Eurich | |
| 2008/0175941 A1 | 7/2008 | Slutsky et al. | |
| 2022/0339851 A1 | 10/2022 | Redford | |

FOREIGN PATENT DOCUMENTS

| | | | | |
|---|---|---|---|---|
| CN | 207724829 U | 8/2018 | | |
| CN | 112297400 A | 2/2021 | | |
| EP | 0302703 A2 | 2/1989 | | |
| EP | 1127676 | * 8/2001 | | B29C 51/38 |
| EP | 1 426 018 A1 | 6/2004 | | |
| JP | 199357786 A | 3/1993 | | |
| JP | H0811200 A | 1/1996 | | |
| JP | 2010247231 A | 11/2010 | | |
| JP | 2012096416 A | 5/2012 | | |
| TW | 200920703 A | 5/2009 | | |
| WO | WO 94/05483 A1 | 3/1994 | | |
| WO | WO 97/04945 A1 | 2/1997 | | |

OTHER PUBLICATIONS

European Search Report dated May 13, 2022 for European Application No. 21 20 9568.1.
Combined Search and Examination Report under Sections 17 & 18(3) dated May 13, 2022 for Great Britain Application No. GB2116792.9.
Search Report under Section 17 dated May 12, 2022 for Great Britain Application No. GB2116792.9.
Biostar® Operation Manual; Scheu-Dental GmbH; Scheugroup; 2020; 26 pages.
Biostar®—Scheu Dental products page; downloaded from the Internet at http://products.scheu-dental.com/laboratory-equipment/pressure-moulding-technique/biostar on Feb. 17, 2021; Scheu Dental GmbH, 2021; 4 pages.
Dunaform Pressure-molder Operating instructions; al dente Dentalprodukte GmbH; rsb Dunadental; 2020; 4 pages.
Erkopress 300 Tp Manual; Erkodent Erich Kopp GmbH; Jun. 18, 2014; 6 pages.
Glidewell Dental; "Erkopress 300 Tp"; YouTube video; https://www.youtube.com/watch?v=IBT0rVYASSY; Jun. 18, 2014; screenshot; 1 page.
Mayku FormBox Starter Book; Instruction manual; Mayku LTD; 2018; 46 pages.
"Mayku Formbox—Professional grade vacuum forming on your desktop"; Mayku Formbox product webpage; Oct. 17, 2015; downloaded from the Internet at https://www.mayku.me/ on Apr. 5, 2021; 7 pages.
Ruly Construye; "Thermoforming Machine and Homemade Skin Packaging—Step by Step Explanation or Maquina de Termoformado y Skin Packaging Casera—Explicación paso a paso"; YouTube video; https://www.youtube.com/watch?v=c44Nwb1EkO0&ab_channel=RulyConstruye; Jul. 20, 2020; screenshot; 1 page.
"Vacuum Forming Machine—Digital Desktop—VaquformTM"; Vaquform product webpage; Oct. 6, 2017; downloaded from the Internet at https://www.vaquform.com/ on Apr. 5, 2021; 9 pages.
Vaquform User Manual; Vaquform, Inc.; 2019; 17 pages.
Vaquform Quick Start Guide; Vaquform, Inc.; 2019; 5 pages.
Ultimate Dental Dunaform Pressure Former product purchase page; downloaded from the Internet at http://www.ultimatedental.com.au/dunaform-pressure-former.html on Feb. 17, 2021; 1 page.
Mayku Multiplier; posted on dynamism.com; no posted date given; no production date given; [online]; [site visited Jan. 6, 2023]; available from internet: URL: https://www.dynamism.com/productivity-tools/3d-formers/mayku-multiplier.html; 2022.
Mayku Multiplier: Features Explained; posted on youtube.com; posted Oct. 2022 [online]; [site visited Jan. 6, 2023]; available from internet; URL: https://www.youtube.com/watch?v=TQ9gAwainzU; 2022.

* cited by examiner

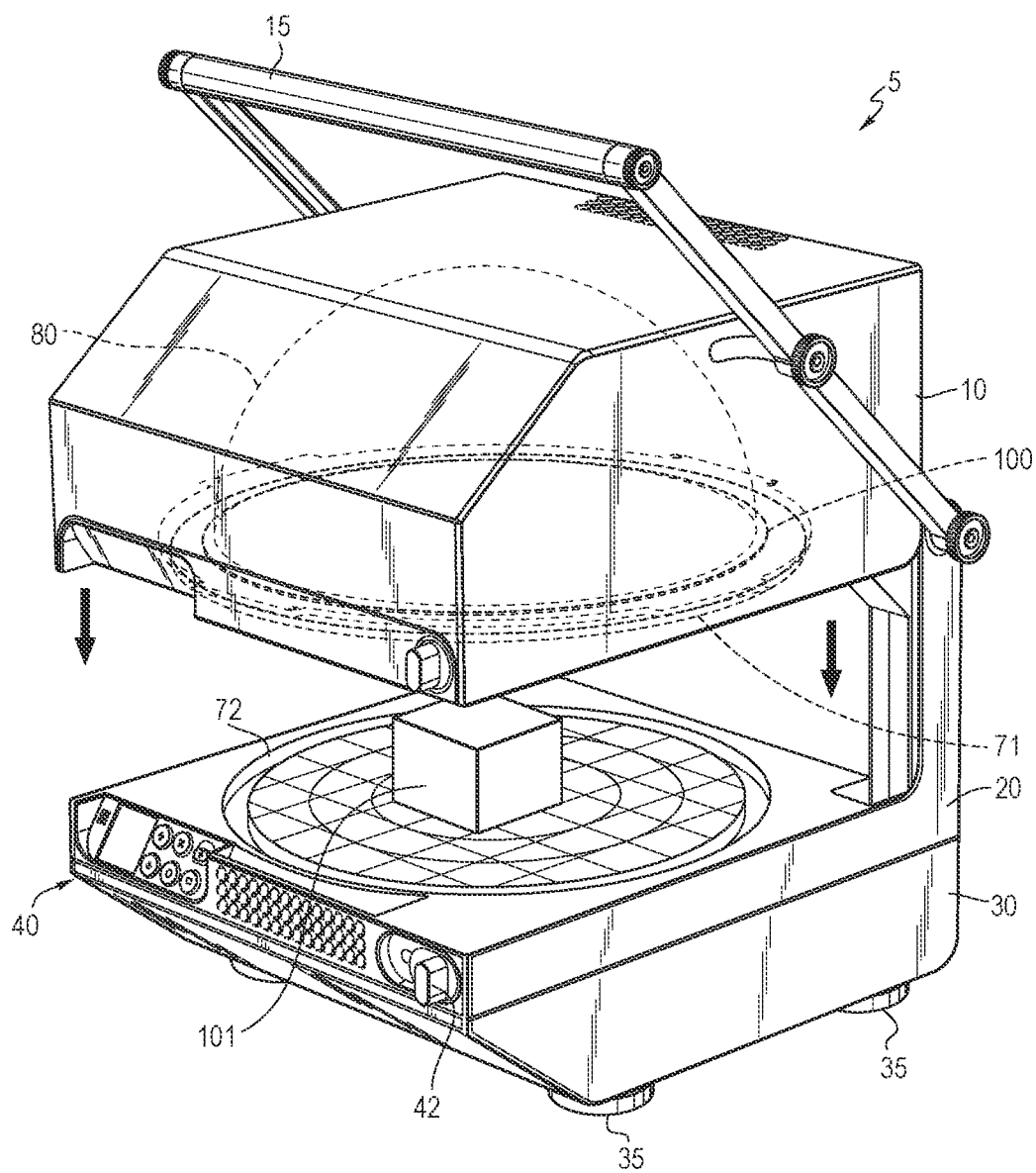

PRESSURE FORMING MACHINE

BACKGROUND

A table-top forming machine can be used to make molds from objects. Some forming machines use a vacuum to apply negative pressure to suction heated plastic around an object. Other forming machines use positive pressure to push down heated plastic around an object. In some pressure-forming machines, the object is placed on a work surface that is positioned next to a hinged pressure chamber. The pressure chamber contains plastic, and the heater is moved over the pressure chamber to heat the plastic. In some machines, the heater is movable with respect to the pressure chamber, while, in other machines, the pressure chamber is movable with respect to the heater. When the plastic reaches the appropriate temperature for forming, the pressure chamber is rotated 180 degrees to position the pressure chamber on top of the object. Pressure is then applied to push the heated plastic over the object to create a mold. The pressure chamber is rotated 180 degrees back to its starting position, so the mold and object can be removed.

BRIEF DESCRIPTION OF THE DRAWINGS

FIGS. 11A-11F are illustrations of a use of a pressure forming machine of an embodiment.

DETAILED DESCRIPTION

Figure 1:
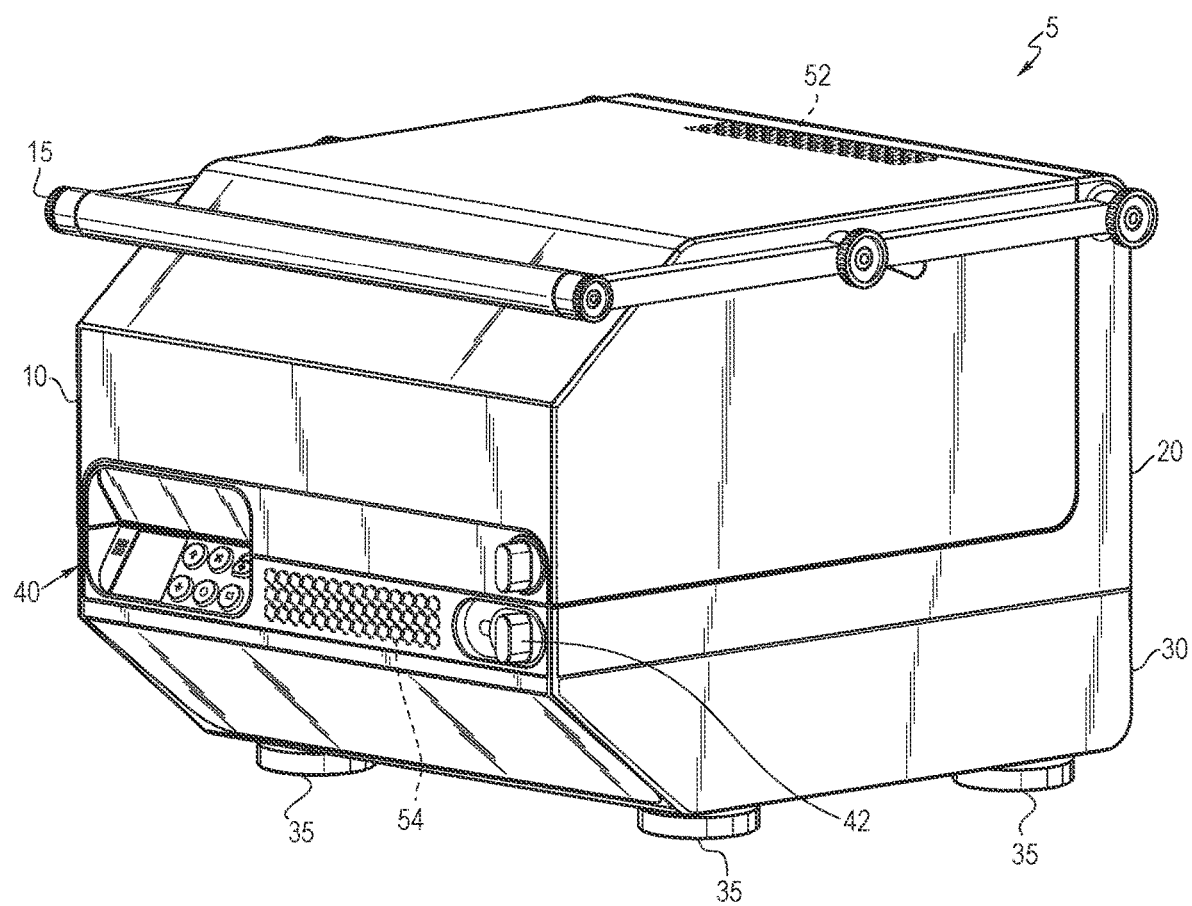
FIG. 1 is a perspective view of a pressure forming machine of an embodiment, where the forming machine is in a closed position.
Figure 2:
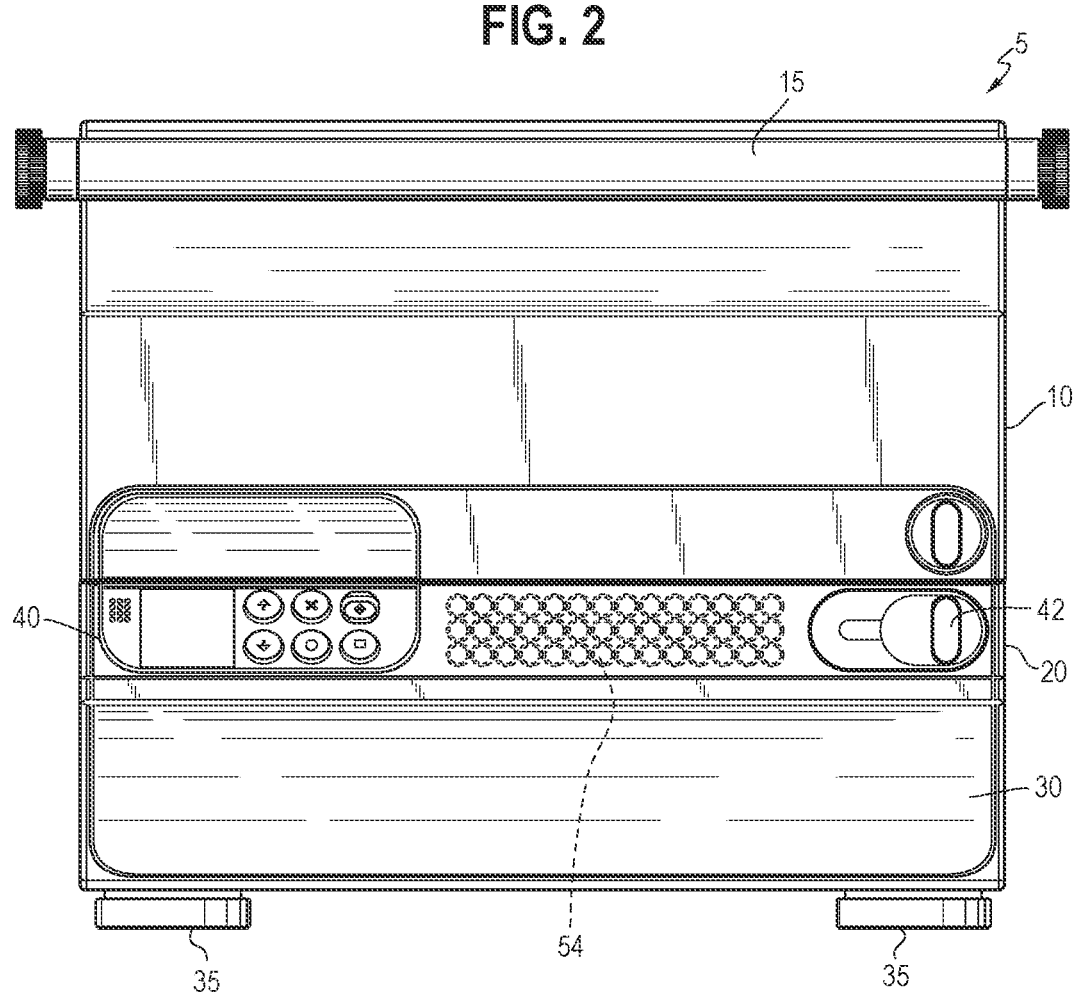
FIG. 2 is a front view thereof.

As noted above, in some pressure-forming machines, an object is placed on a work surface that is positioned next to a hinged pressure chamber. The pressure chamber contains plastic, and the heater is moved over the pressure chamber to heat the plastic. In some machines, the heater is movable with respect to the pressure chamber, while, in other machines, the pressure chamber is movable with respect to the heater. When the plastic reaches the appropriate temperature for forming, the pressure chamber is rotated 180 degrees to position the pressure chamber on top of the object. Pressure is then applied to push the heated plastic over the object to create a mold. The pressure chamber is rotated 180 degrees back to its starting position, so the mold and object can be removed. Such pressure forming machines contain many points of possible mechanical failure and have a relatively-large footprint. The following embodiments avoid these issues by providing a pressure forming machine that integrates the heater in the pressure chamber.

Turning now to the drawings, FIGS. 1-7 are diagrams of various views of a pressure forming machine 5 of an embodiment. It should be understood that this is merely one example implementation and that other implementations can be used. As shown in these drawings, in one embodiment, the pressure forming machine 5 of this embodiment comprises a lid 10 coupled with a handle 15. As used herein, the phrase "coupled with" can mean directly coupled with or indirectly coupled with through one or more components, named or unnamed herein.

The pressure forming machine 5 also comprises top and bottom base components 20 and 30. The bottom component 30 comprises feet 35 that allow the pressure forming machine 5 to be positioned on a desktop. The pressure forming machine 5 also comprises various ventilation openings 52, 54, 56. The lid 10 and top base component 20 contain a user interface 40 that contains a display and various user input devices, such as slide 42.

The pressure forming machine 5 can comprise hardware and/or software to control the operation of the pressure forming machine 5 (e.g., to turn the heater 90 on/off, to pressurize the dome 80, to issue alerts, etc.). For example, the pressure forming machine 5 can comprise a processor that executes computer-readable provide code stored in a memory in the pressure forming machine 5. As another example, the pressure forming machine 5 can comprise a dedicated hardware component, such as an application-specific integrated circuit (ASIC). The hardware/software component can display information on the display and take input from the user input devices of the user interface 40.

Figure 3:
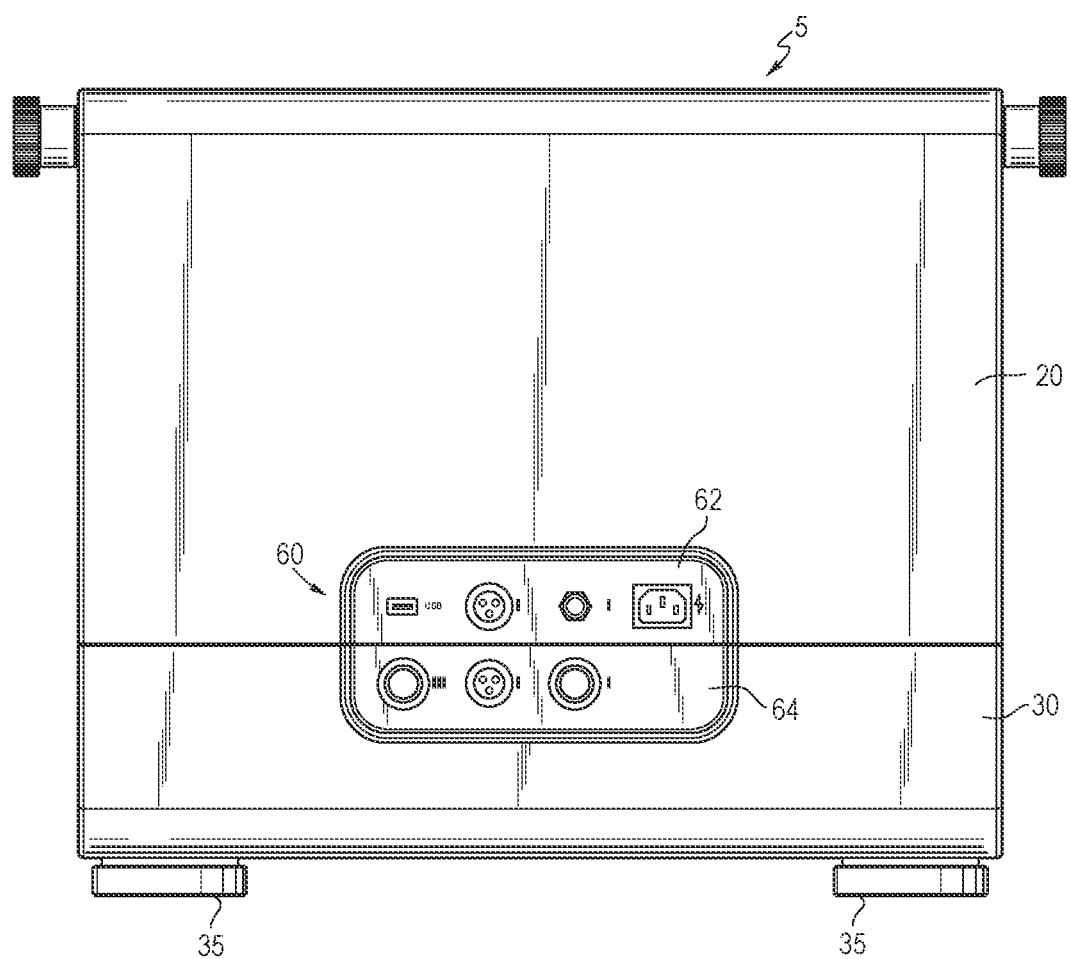
FIG. 3 is a back view thereof.
Figure 4:
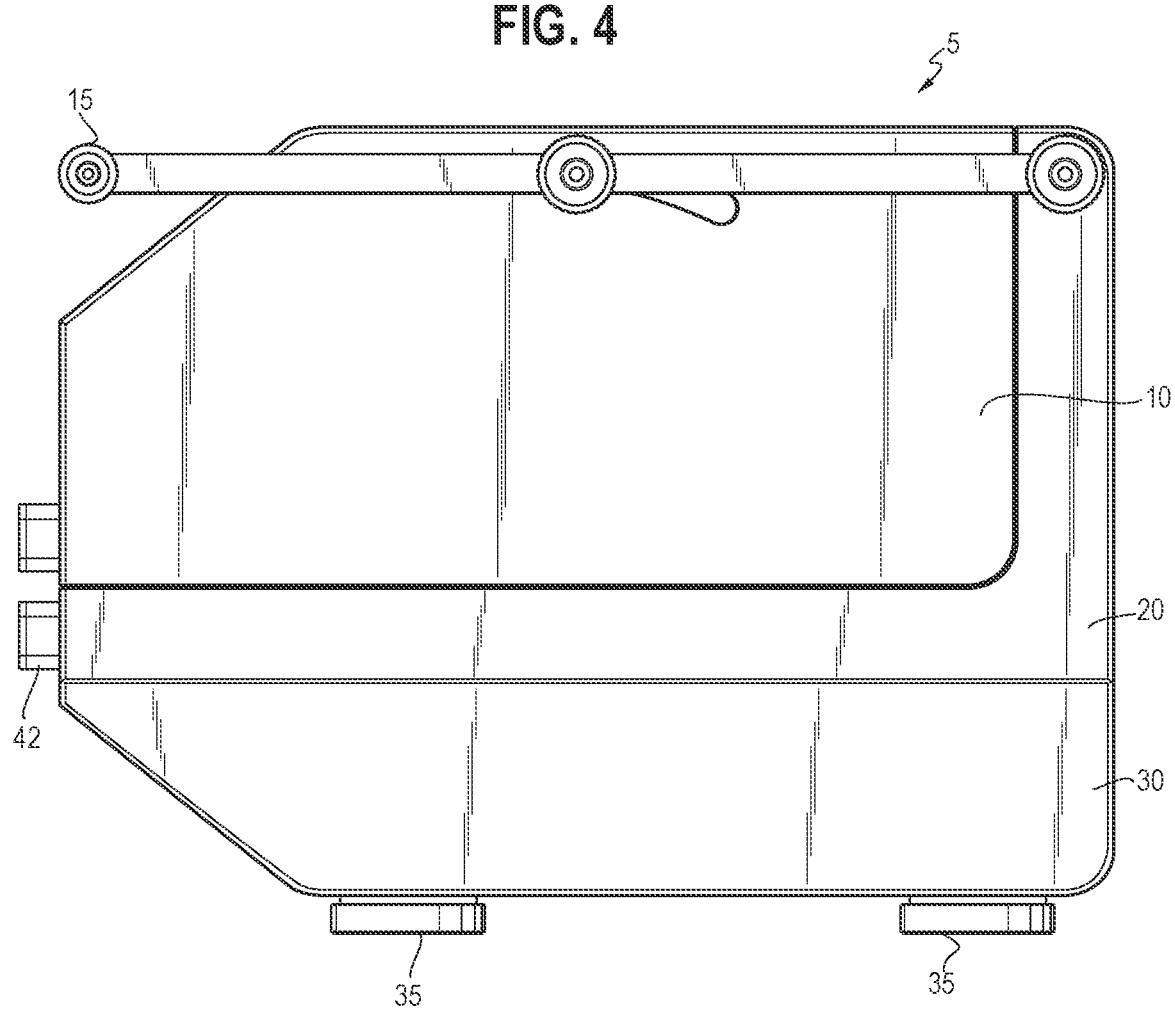
FIG. 4 is a right side view thereof.
Figure 5:
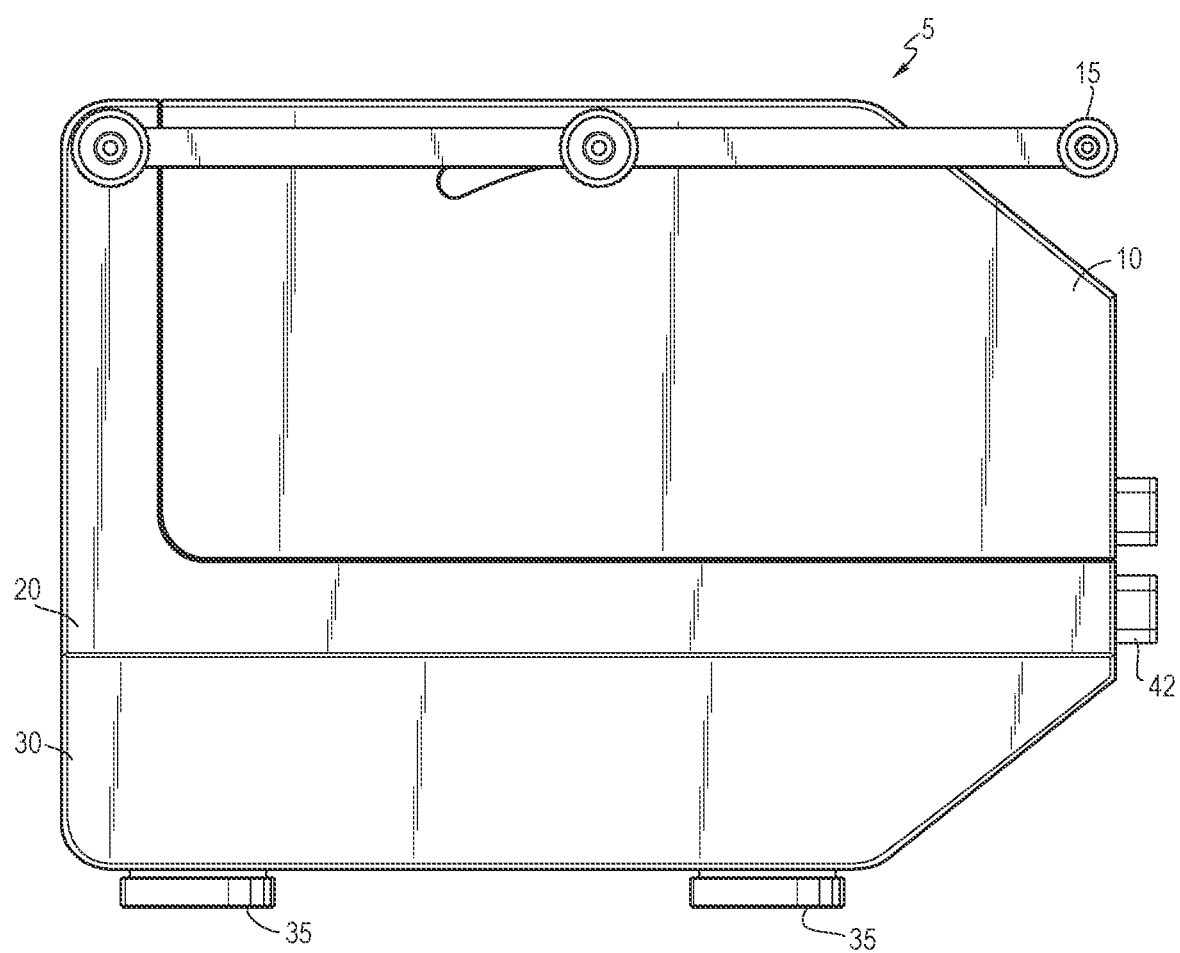
FIG. 5 is a left side view thereof.
Figure 6:
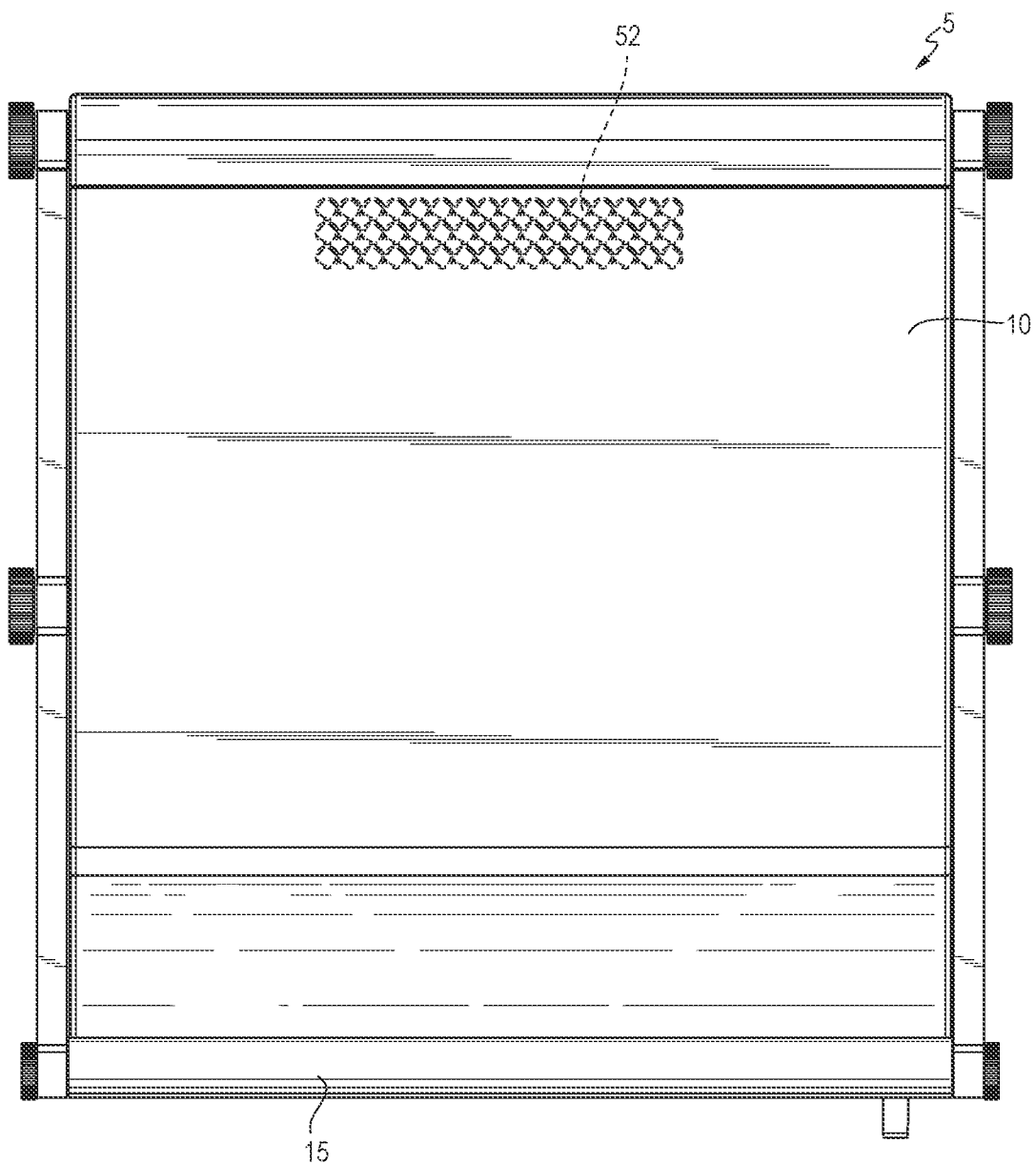
FIG. 6 is a top view thereof.
Figure 7:
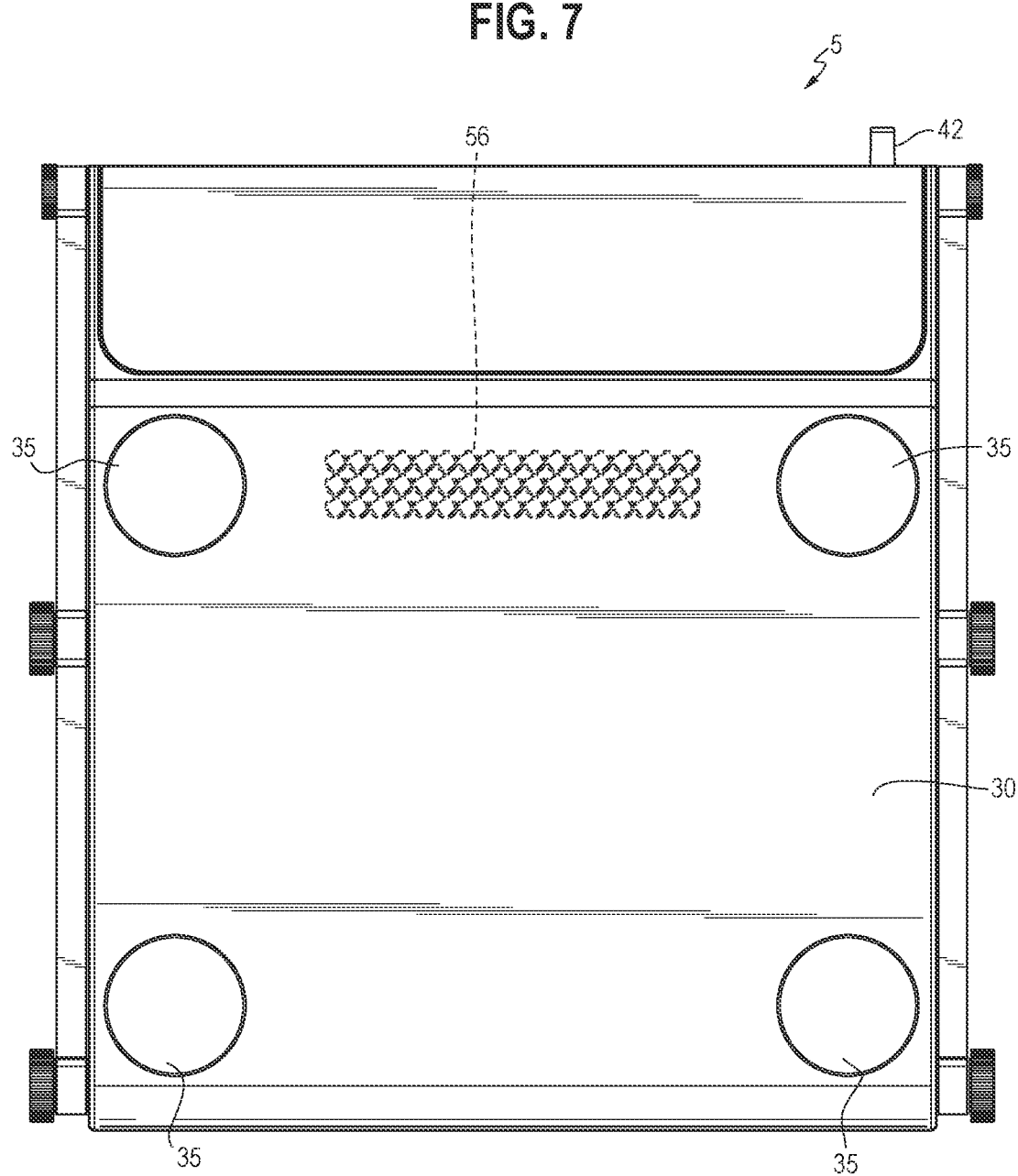
FIG. 7 is a bottom view thereof.

As illustrated in FIG. 3, the rear of the pressure forming machine 5 comprise various ports 60, with some of the ports located on the top base components 20 and other ports located on the bottom base component 30. The ports in this particular implementation (other ports can be used in other implementations) include a power input for receiving power from a wall outlet or battery and a Universal Serial Bus (USB) port to allow data transfer between the machine 5 and a computing device. In this embodiment, the bottom base component 30 comprises an air compressor, and port(s) on the bottom base component 30 provide compressed air to corresponding input port(s) on the top base component 20 (via cabling, not shown). Also, power supplied to the top base component 20 from the power port and be provided to the bottom base component 30 via another port (via cabling, not shown). As will be discussed in more detail below, the top and bottom base components 20 and 30 can be integrated or removable from one another. This allows the air compressor in the bottom base component 30 to be removed from and physically distanced from the top base component 20.

Figure 8:
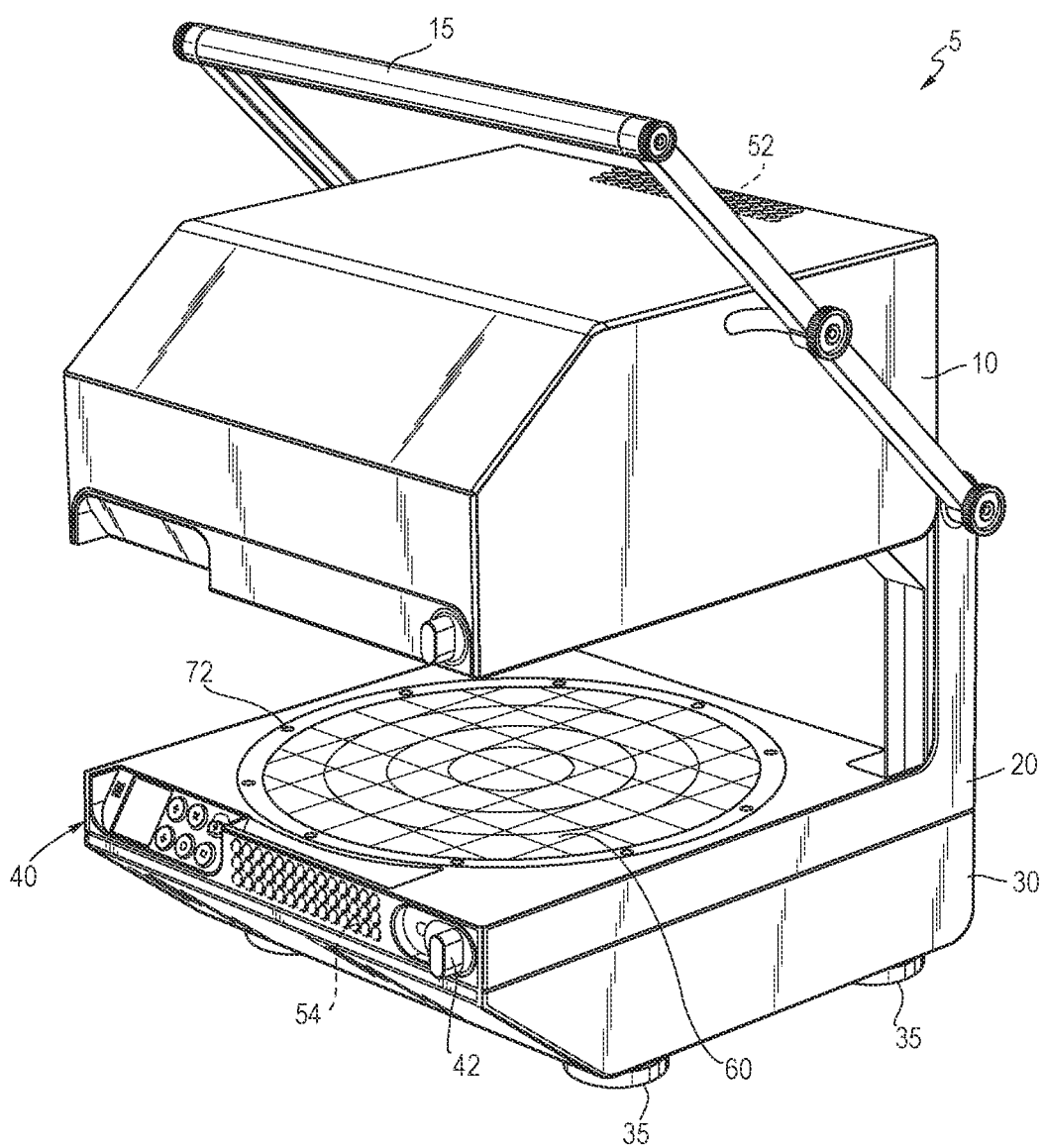
FIG. 8 is a perspective view of a pressure forming machine of an embodiment, where the forming machine is in an open position.
Figure 9:
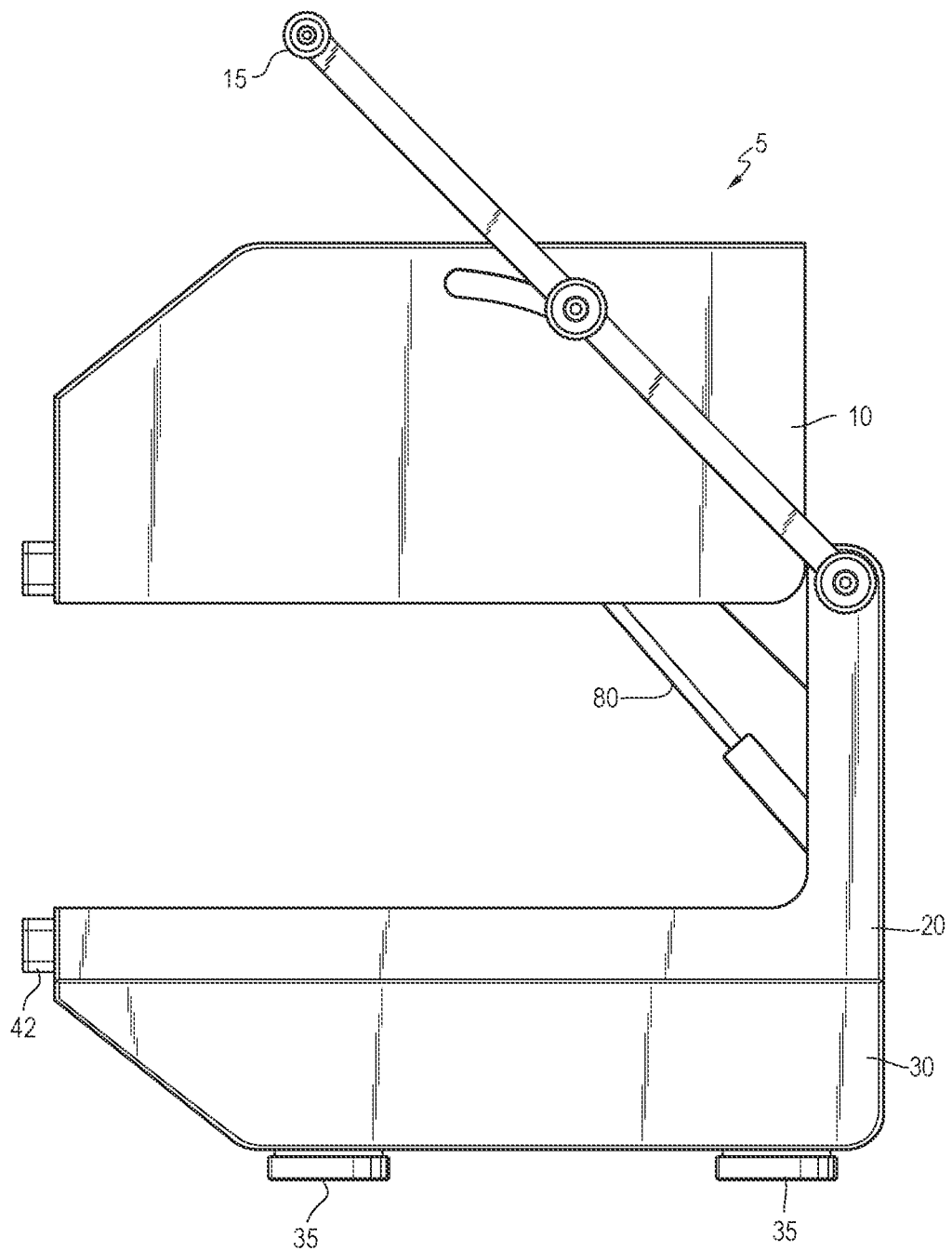
FIG. 9 is a right side view thereof.

In this embodiment, the lid 10 is movable from a first position where the lid 10 is positioned away from the top base component 20 (see FIG. 8) to a second position where the lid 10 is in contact with the top base component 20 (see FIG. 1). In this embodiment, the lid 10 moves only vertically between the first and second positions (unlike prior pressure forming machines where a hinged lid is moved 180 degrees between the open and closed positions). Further, as shown in FIG. 9, in this embodiment, a piston 80 is used to slow the movement of the lid 10 from the first position to the second position. As will be described below, in this embodiment, the lid 10 contains a relatively fragile heater 90, and using the piston 80 to slow the movement of the lid 10 can prevent the heater 90 from being damaged by jarring movement.

Figure 10A:
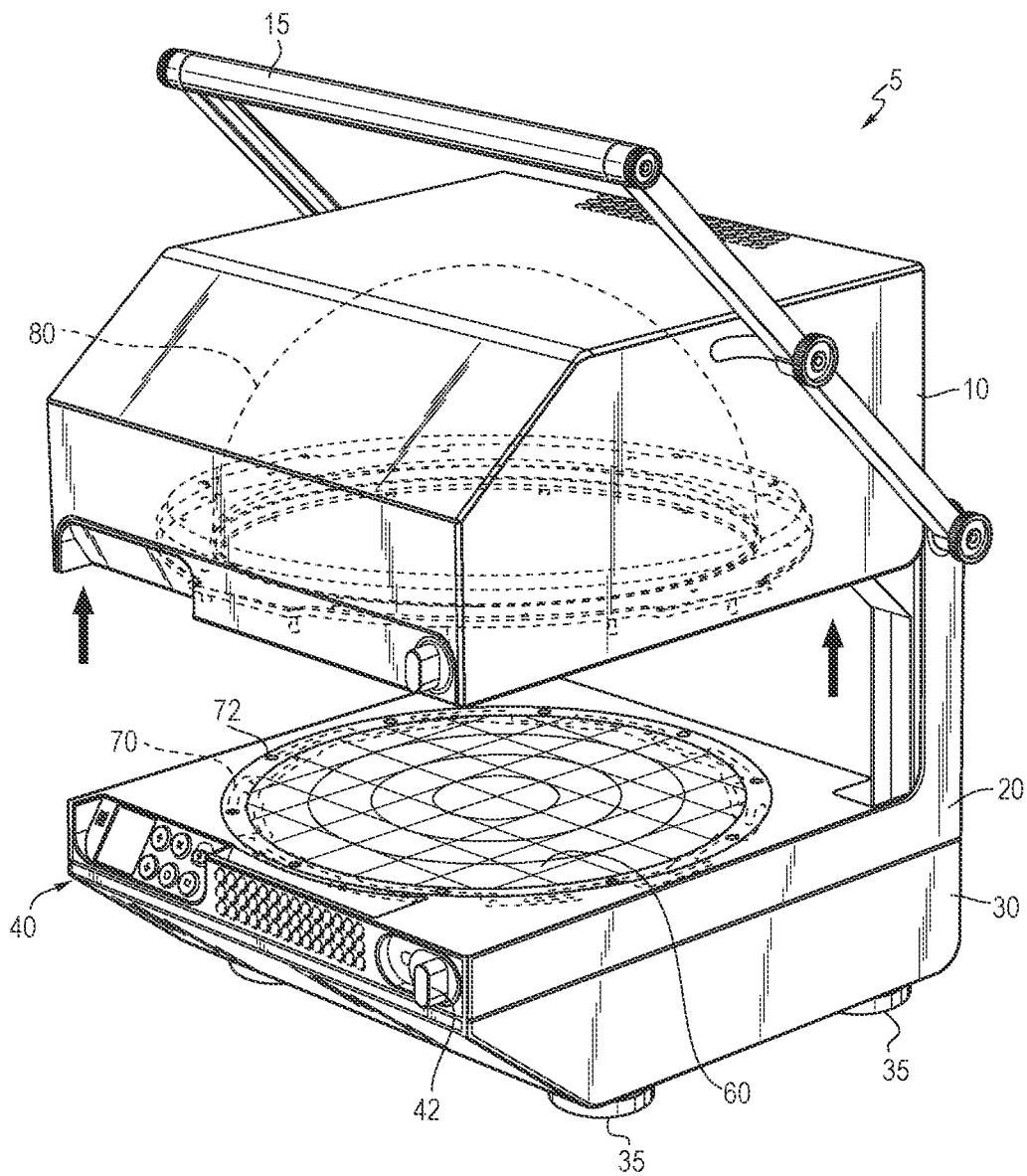
FIG. 10A is a perspective view thereof with the inner pressure/heater dome and lock ring shown in dashed lines.
Figure 10B:
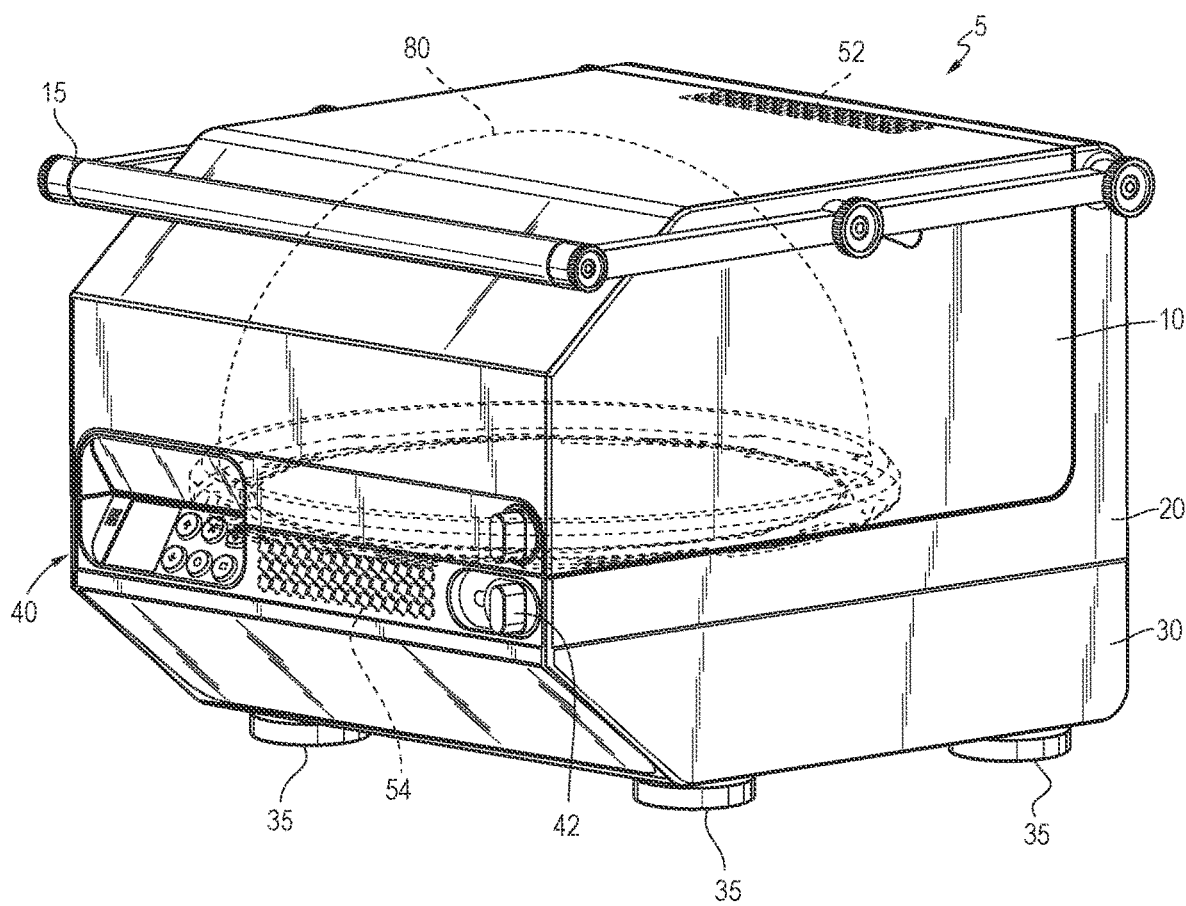
FIG. 10B is a perspective view thereof, where the forming machine is in a closed position and the inner pressure/heater dome and lock ring are shown in dashed lines.

As shown in FIG. 10A, in this embodiment, the top base component 20 comprises a work surface 60, which is where a user places a plastic sheet and, later, an object of interest, so the plastic sheet can be formed around the object of interest. Internal to the lid 10 is a dome 80, which contains a pressure chamber and a heater 90 inside the pressure chamber (see FIG. 18). The heater 90 can take any suitable form, such as, but not limited to a ring heating element made of ceramic or quartz.

Because the heater 90 is inside the pressure chamber, the heater 90 moves along with the pressure chamber when the lid 10 is moved between the first and second positions (in contrast to prior art machines where the pressure chamber and heater are separate components and independently movable with respect to one another). In this embodiment, a lock ring 70 (covered by a lock ring cover 71) is positioned under the circumference of the work surface 60. The lock ring cover 71 comprises one or more openings 72 sized to accept a one or more lock pins 84 of the dome 80 (see FIG. 12). It should be understood that while a dome and circular plastic sheet are used to illustrate this example, other suitable shapes can be used.

Figure 13:
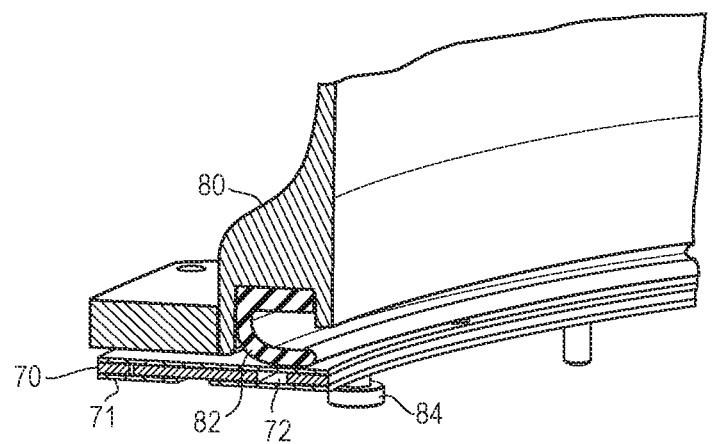
FIG. 13 is a partial perspective view of a pressure/heater dome and lock ring of an embodiment, where the pressure/heater dome is engaged with the lock ring.
Figure 14:
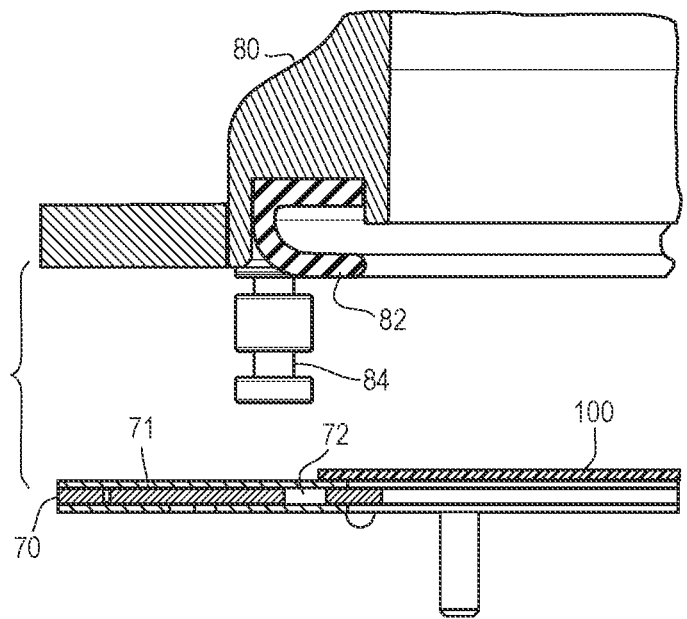
FIG. 14 is a partial side view of a pressure/heater dome and lock ring of an embodiment, where the pressure/heater dome is disengaged from the lock ring.
Figure 15:
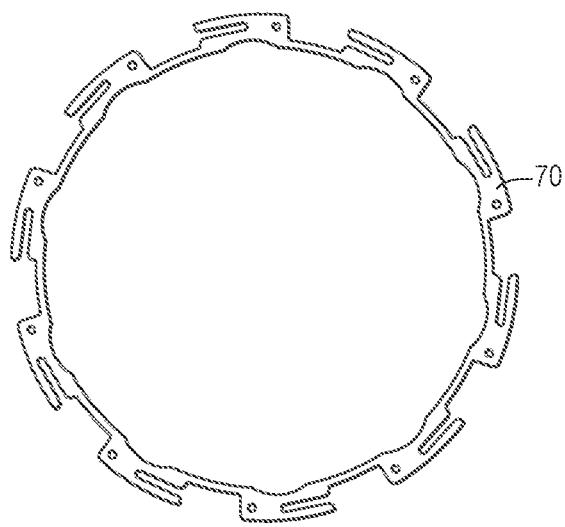
FIG. 15 is an illustration of a lock ring of an embodiment.
Figure 16:
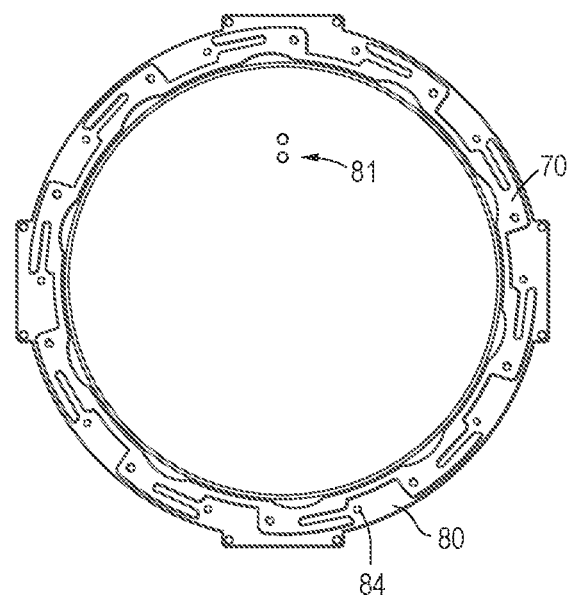
FIG. 16 is an illustration of a lock ring and lock pins of an embodiment, where the lock ring is disengaged from the lock pins.
Figure 17:
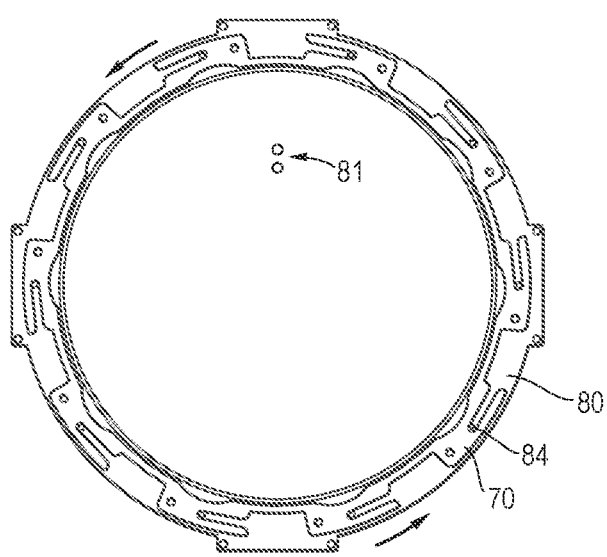
FIG. 17 is an illustration of a lock ring and lock pins of an embodiment, where the lock ring is engaged with the lock pins.

In shown in more detail in FIGS. 12-17 and 19, when the lid 10 is lowered to the second position, the lock pins 84 on the dome 80 are inserted into the openings 72 of the lock ring cover 71. As shown in FIGS. 15 and 16, the lock ring 70 has a plurality of U-shaped grooves, and when the dome 80 is lowered on top of the work surface 60, the lock pins 84 are positioned adjacent to the grooves. When the user moves the slider 42 on the user interface 40, the lock ring 70 rotates 45 degrees within the lock ring cover 71 and moves the grooves, so they engage with the lock pins 84. When the lock ring 70 is rotated and engages the lock pins 84, the dome 80 is pulled tightly against the lock ring cover 71, locking the two components in place.

Figure 12:
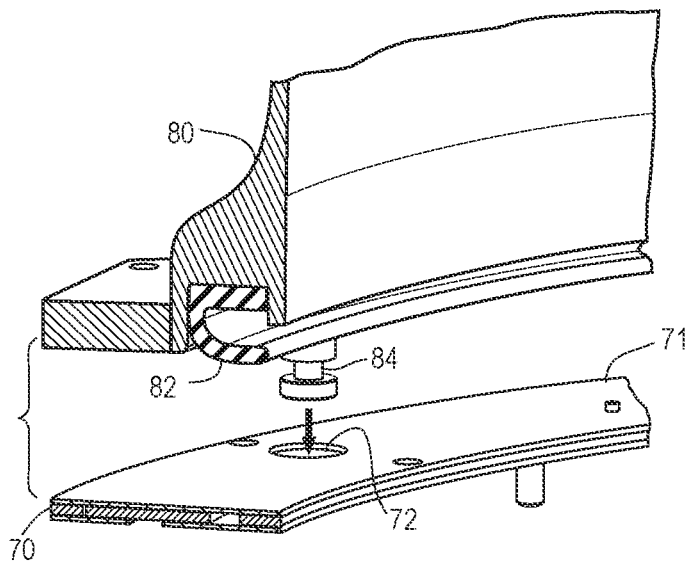
FIG. 12 is a partial perspective view of a pressure/heater dome and lock ring of an embodiment, where the pressure/heater dome is disengaged from the lock ring.

As shown in FIGS. 12-14, the edge of the dome 80 comprises a flexible seal 82 along its circumference. So, when the lock ring 70 is rotated and the dome 80 is pulled tightly against the lock ring cover 71, the flexible seal 82 creates a seal between the flexible seal 82 and a plastic sheet 100 (see FIG. 14) positioned on the work surface 60 (the edges of the plastic sheet are positioned between the flexible seal 82 and the lock ring cover 71). In one embodiment, the flexible seal 82 comprises a compressible silicone seal that enables the creation of a pressurized seal with a variety of different thicknesses of material (e.g., 0.25 to 5 mm).

Figure 11A:
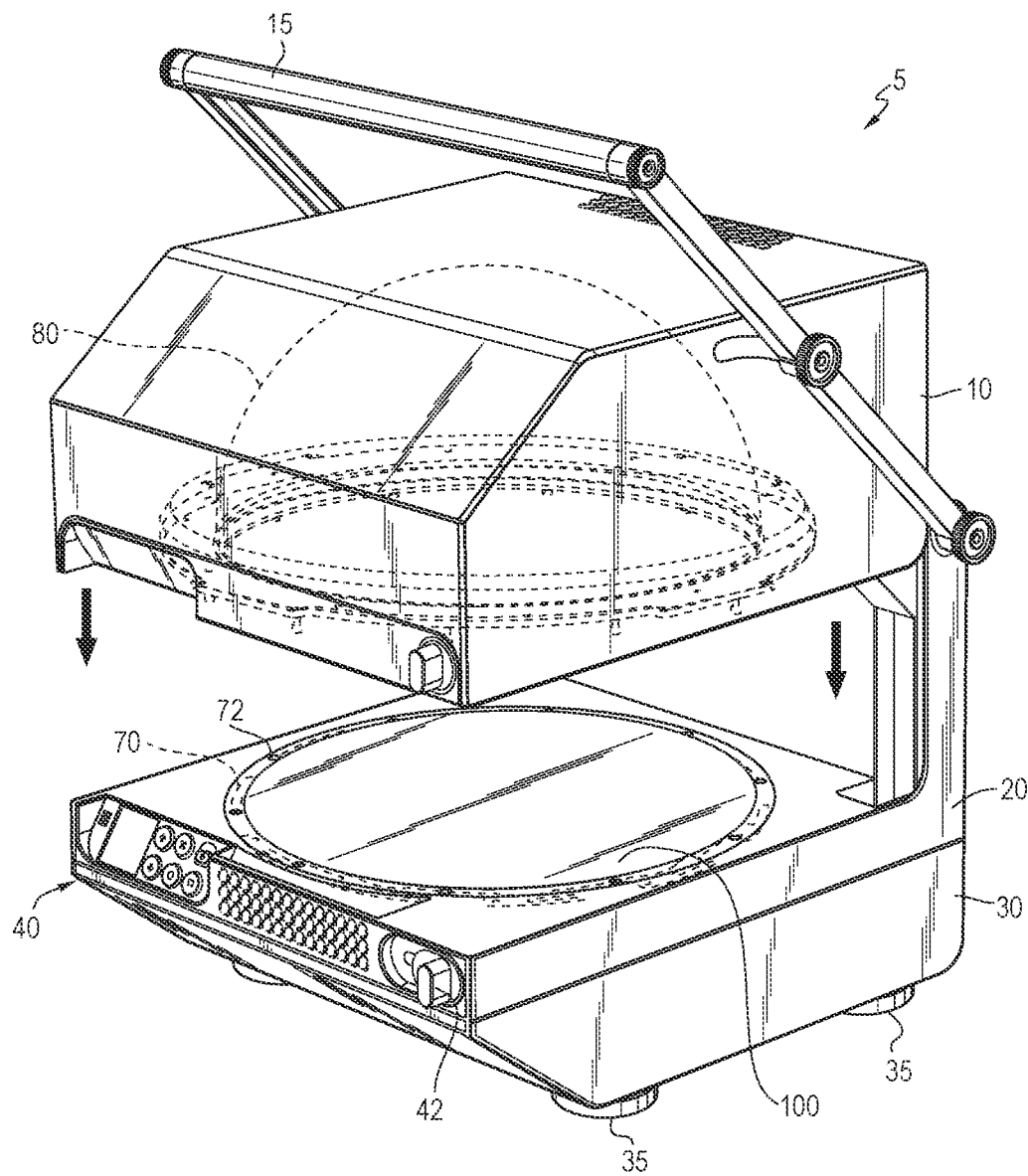
Figure 11B:
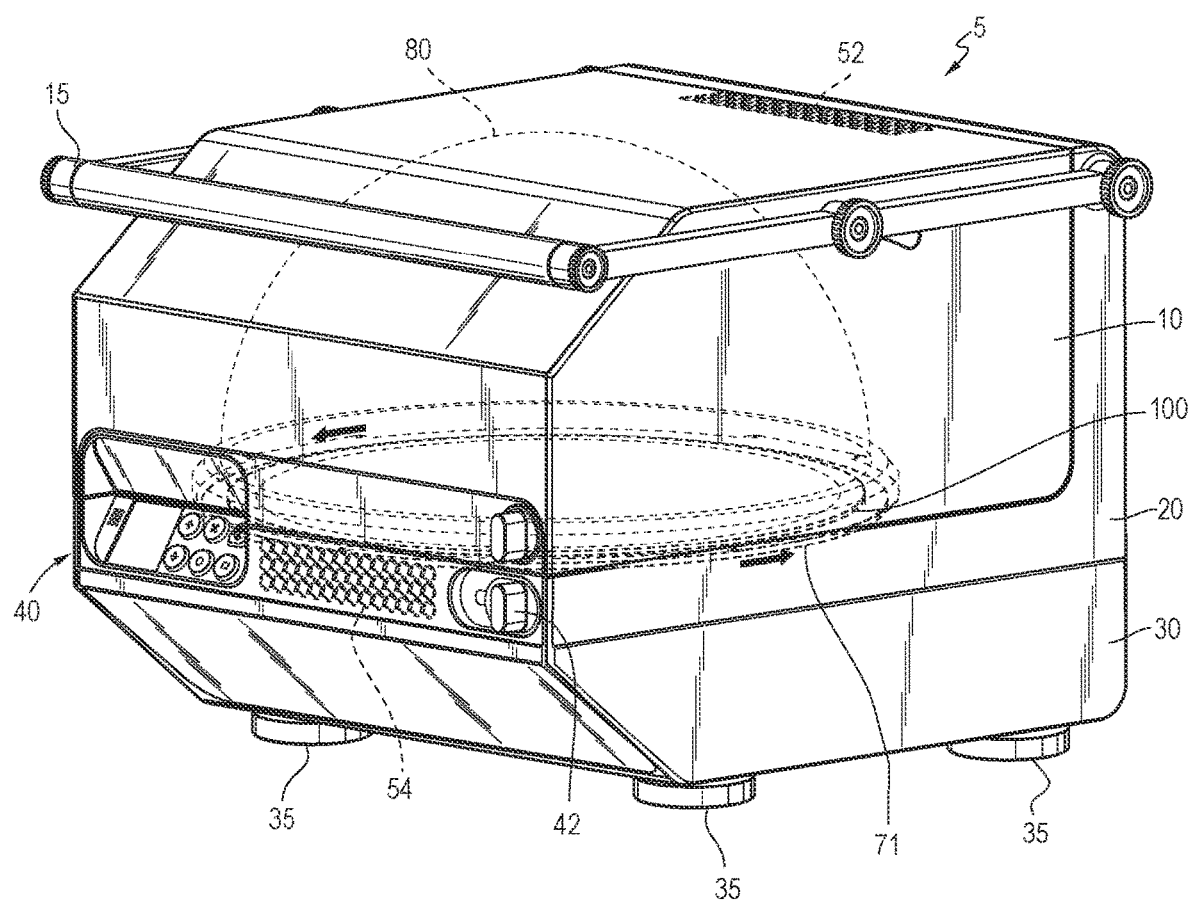
Figure 11C:
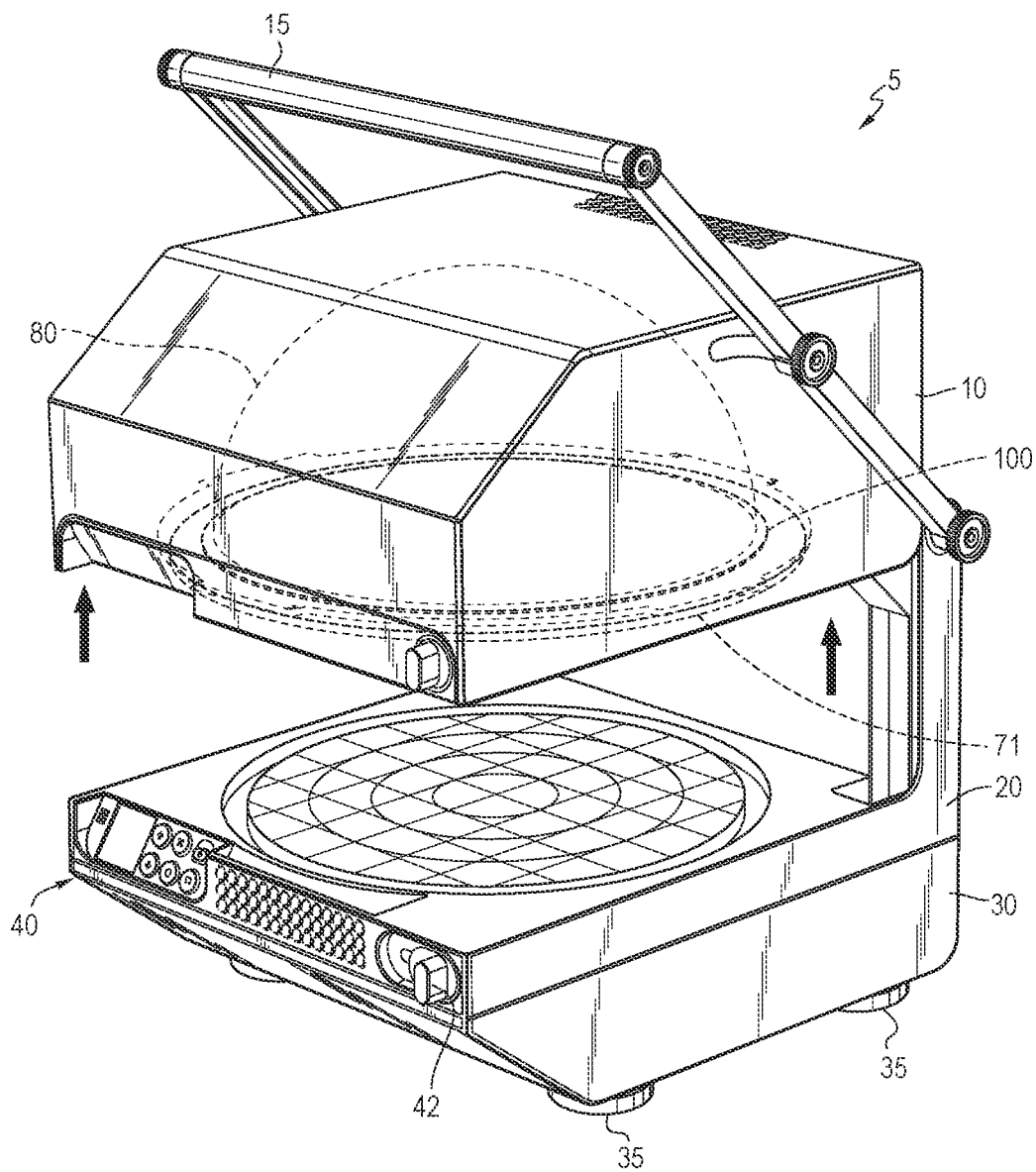

FIGS. 11A-11F illustrate the operation of this machine 5. To begin, a user uses the handle 15 to raise the lid 10 to the second position and places a circular plastic sheet 100 on the work surface 60 (FIG. 11A). The user then closes the lid 10 and moves the slider 42, which engages the locking ring 70, as discussed above, to create a seal between the flexible seal 82 of the dome 80 and the circumference of the plastic sheet 100, as supported by the lock ring cover 71 (FIG. 11B). The user then raises the lid 10 back to the second position (FIG. 11C). Because the lock ring 70 is engaged with the pins 84 of the dome 80, the lock ring 70 lifts off the top base component 20. The user then places a three-dimensional object 101 to be molded on the work surface 60 (FIG. 11D).

Figure 11E:
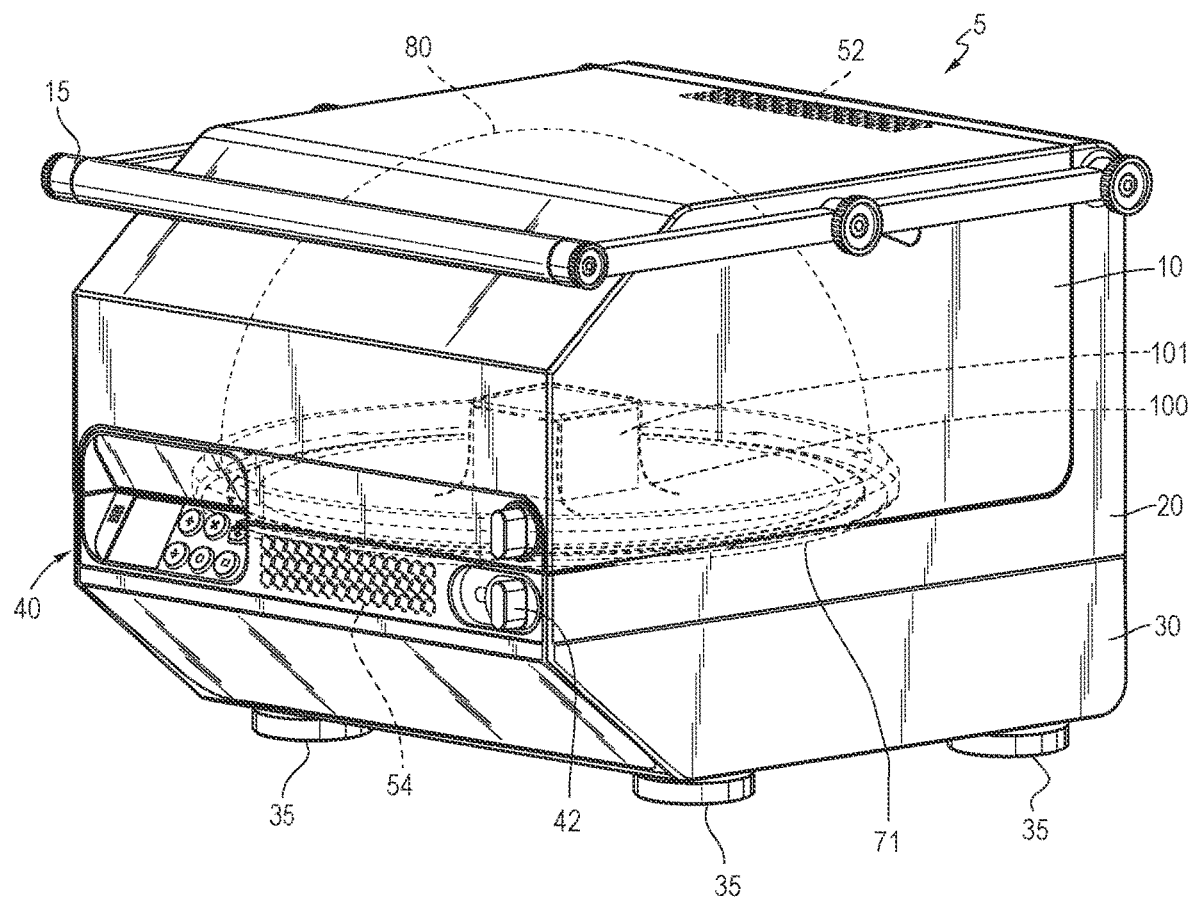
Figure 11F:
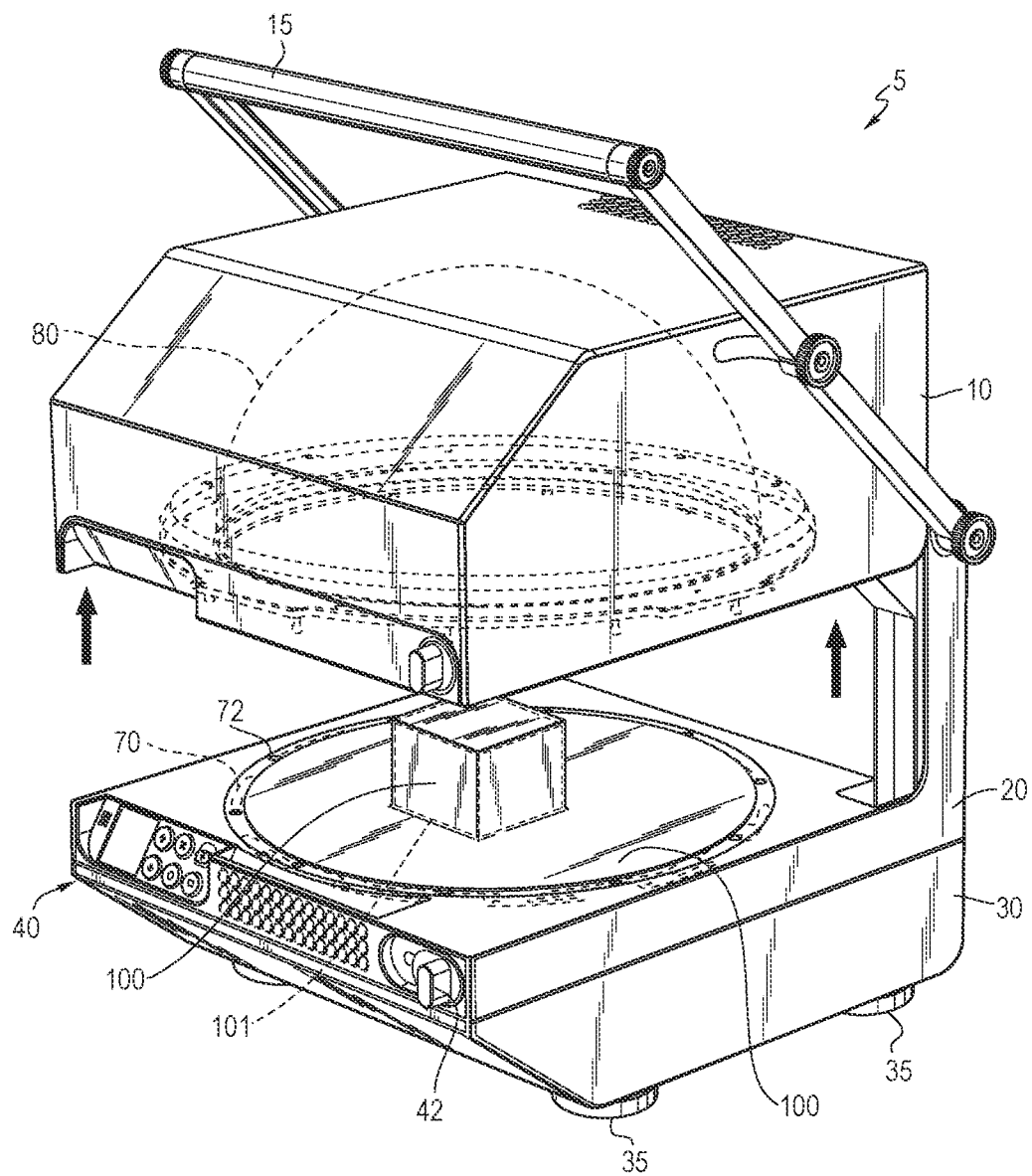
Figure 18:
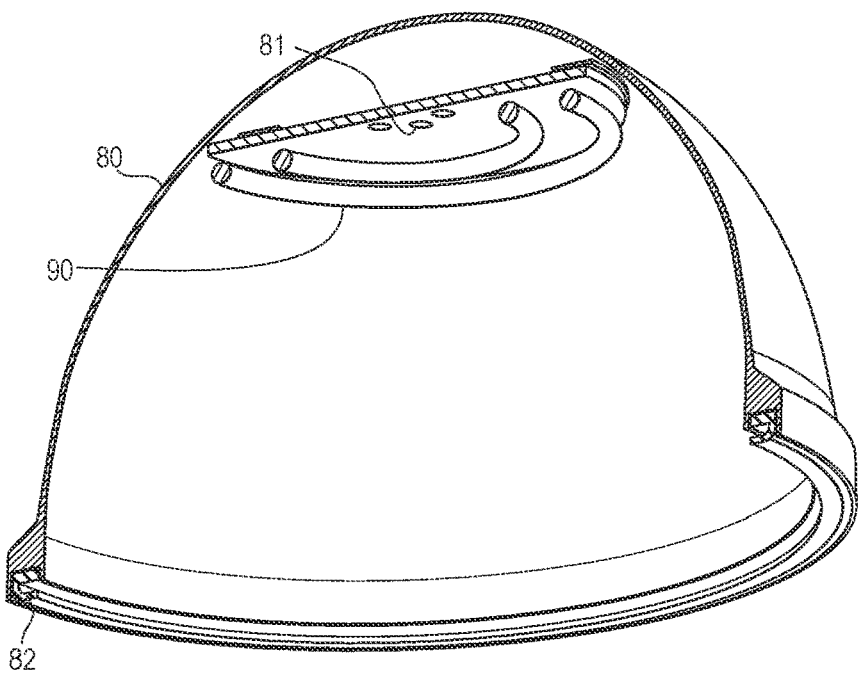
FIG. 18 is a partial perspective view of a pressure/heater dome of an embodiment.
Figure 19:
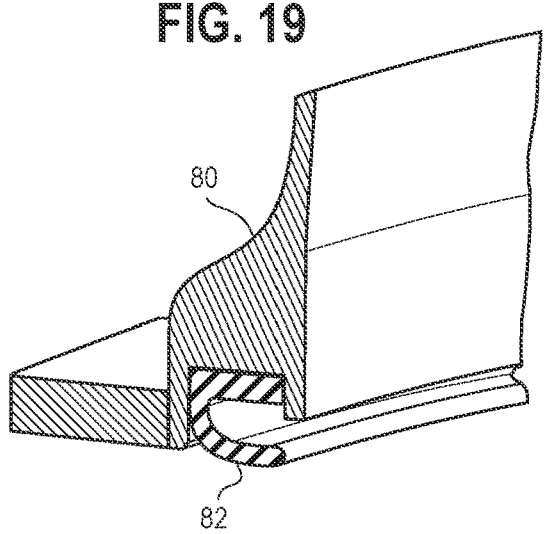
FIG. 19 is a partial perspective view of an edge of a pressure/heater dome of an embodiment.
Figure 20:
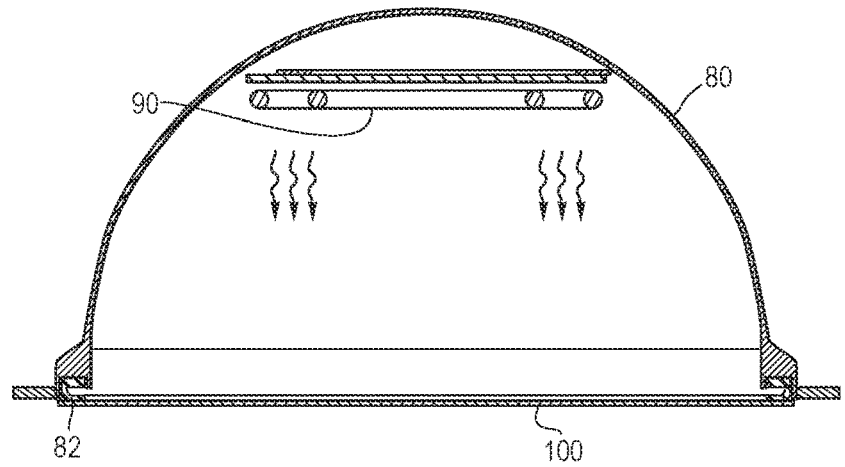
FIG. 20 is a cross-sectional view of a pressure/heater dome of an embodiment.

At this point, the plastic sheet 100 is sealed against the dome 80 and positioned above the object 101. As shown in FIGS. 18 and 20, in this embodiment, the dome 80 contains air ports 81 to receive compressed air (allowing the dome 80 to serve as a pressure chamber) and a heater 90. When the heater 90 is activated (e.g., under the direction of the user interface 40), the heater 90 heats the plastic sheet 100 secured to the dome 80. The user can select the type and thickness of the plastic sheet (or other material) via the user interface 40, which can be used to determine the heat and pressure needed for forming. In this embodiment, a compressor in the bottom base component 30 pressurizes air supplied by two air tanks. When the appropriate temperature and pressure is reached, the user is alerted, so he can move the lid 10 down to the second position (FIG. 11E). The heated plastic sheet 100 is semi-melted at time point and is pliable enough to form around the object of interest 101 on the work space 60 as the mechanical pressure of closing the lid 10 forces the plastic sheet 100 over the object 101. The pressurized air entering the pressure chamber/dome 80 further pushes the plastic sheet 100 over the object 101 to capture the details of the object. Once the form has cooled, the user lifts the lid 10 and removes the molded plastic 100 (now three-dimensional like the object 101, and no longer a flat sheet of plastic) from the work space 60 (FIG. 11F).

There are many advantages associated with these embodiments. As discussed above, prior pressure forming machines that use separate heating and pressure chambers can have a relatively-large footprint because separate chambers are used. In contrast, by integrating the heater with the pressure chamber in these embodiments, the footprint of the overall machine can be reduced. Further, because the heater and pressure chamber are movable together in a simple up-and-down movement in these embodiments, these embodiments eliminate the complicated movements and points of possible mechanical failure present in the prior machines.

Figure 21:
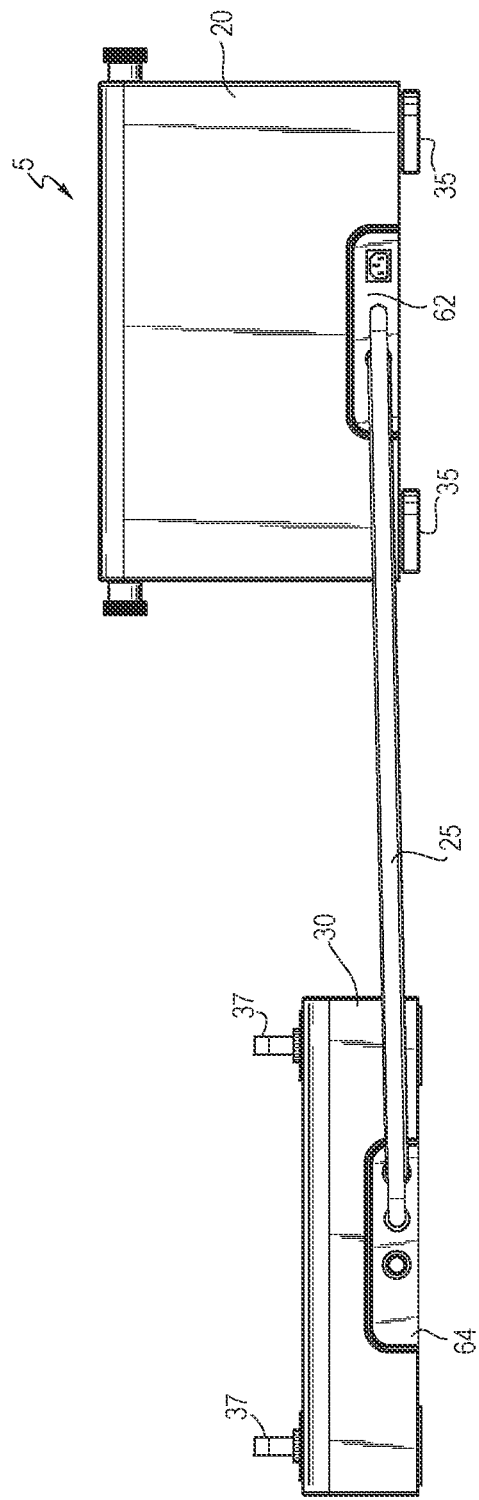
FIG. 21 is an illustration of a pressure forming machine of an embodiment, where a pressure generating section is removed and physically distanced from a pressure/heater section.

There are several alternatives that can be used with these embodiments. For example, as shown in FIG. 21 and as mentioned above, in one embodiment, the bottom base component 30 can be separated from the top base component 20 (and the feet 35 can be moved from one component to the other). This allows the bottom base component 30 to be physically distanced from the top base component 20, with the ports 62, 64 connected with a longer connector 25. Such an arrangement may be desired for noise reduction purposes. More specifically, in this embodiment, the bottom base component 30 contains two air chambers and a pneumatic pump, which can be quite loud. Moving the bottom base component 30 away from the top base component 20 (and the user) can create a less noisy environment for the user. As shown in FIG. 21, long cables 25 can provide pressure, electrical, and power between the top and bottom components 20, 30. When the top and bottom components 20, 30 are positioned on top of one another, shorter cables can be used. It should be noted that while the two base components are on top of one another in this example, other arrangements can be used (e.g., the two base components can be next to each other instead of on top of each other).

Figure 22:
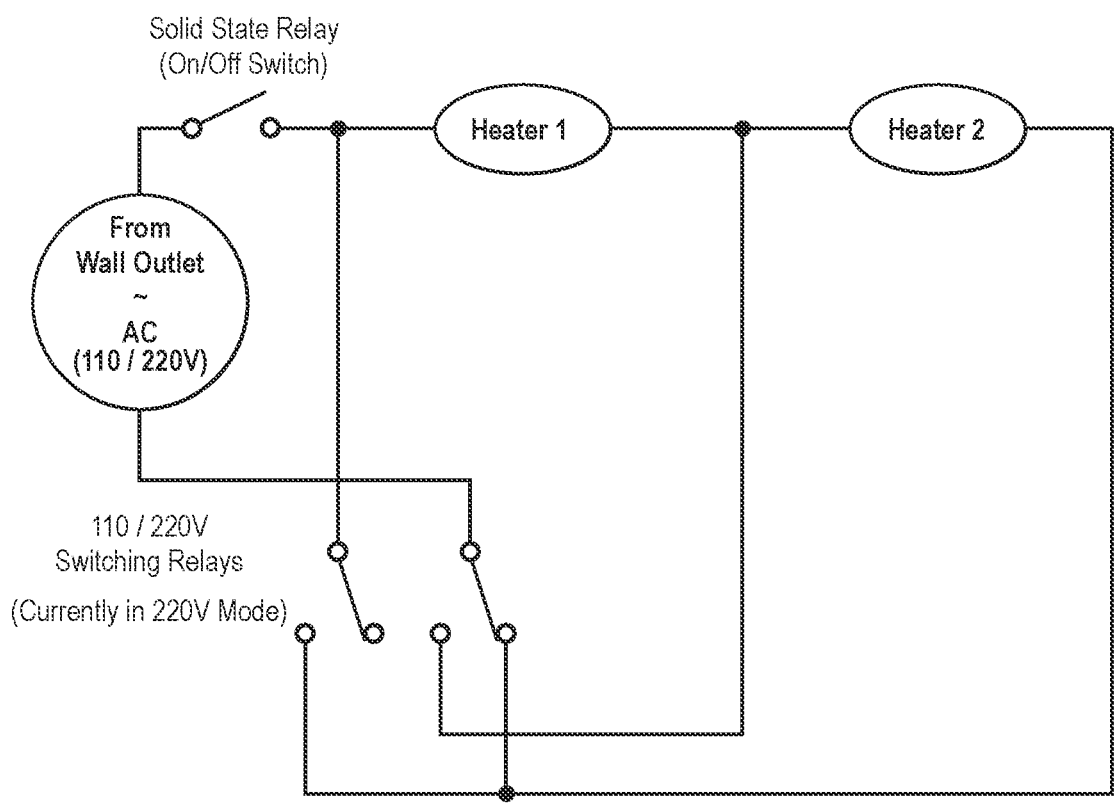
FIG. 22 is a block diagram of an electrical circuit of an embodiment.

Another alternative is shown in the circuit diagram in FIG. 22. Different countries operate with different voltages. For example, the United States and Canada use 120 volts, while the United Kingdom and Europe use 240 volts. To avoid making different products for different countries, the circuit shown in FIG. 22 can be used. As shown in FIG. 22, in this embodiment, two heaters are used, and switching relays automatically switch to place the heaters in parallel or in series depending on whether 120 or 240 volts are detected by the product.

As yet another alternative, if the pressure of the air coming into the dome 80 is high enough to possibly damage the heater 90, a muffling material can be placed near the air ports in the dome 80 and/or near the heater 90 to prevent such damage.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A pressure forming machine comprising:
   a base;
   a pressure chamber;
   a heater located inside the pressure chamber, wherein the pressure chamber and heater are movable together between a first position where the pressure chamber is positioned away from the base and a second position where the pressure chamber is positioned closer to the base;
   a first locking element fixed to the pressure chamber and movable together with the pressure chamber between the first and second positions;
   a second locking element removably positioned in the base; and
   a user input device movable between a disengaged position and an engaged position, wherein in the engaged position, the second locking element is engaged with the first locking element and is movable together with the pressure chamber as the pressure chamber moves from the first position to the second position.

2. The pressure forming machine of claim 1, wherein an edge of the pressure chamber comprises a flexible seal.

3. The pressure forming machine of claim 1, further comprising an additional heater and circuitry for running the heater and the additional heater in parallel or in series depending on a detected amount of voltage.

4. The pressure forming machine of claim 1, wherein the second locking element comprises a lock ring, and wherein the first locking element comprises at least one lock pin configured to engage with the lock ring.

5. The pressure forming machine of claim 4, wherein movement of the lock ring engages the lock ring with the least one lock pin of the pressure chamber.

6. The pressure forming machine of claim 1, wherein the pressure chamber and heater move only vertically between the first and second positions.

7. The pressure forming machine of claim 1, further comprising a piston configured to slow a movement of the pressure chamber from the first position to the second position.

8. The pressure forming machine of claim 1, wherein the heater comprises a ring heating element.

9. The pressure forming machine of claim 1, wherein the pressure chamber is dome shaped.

10. The pressure forming machine of claim 1, wherein the base comprises a first component and a second component removable from the first component.

11. The pressure forming machine of claim 10, wherein the second component comprises an air compressor.

12. A pressure forming machine comprising:
    a first component comprising:
      a base;
      a dome-shaped pressure chamber;
      a ring heating element located inside the dome-shaped pressure chamber, wherein the dome-shaped pressure chamber and ring heating element are movable together between a first position where the dome-shaped pressure chamber is positioned away from the base and a second position where the dome-shaped pressure chamber is positioned closer to the base;
      at least one lock pin fixed to the dome-shaped pressure chamber and movable together with the dome-shaped pressure chamber between the first and second positions;
      a lock ring element removably positioned in the base; and
      a user input device movable between a disengaged position and an engaged position, wherein in the engaged position, wherein moving the user input device from the disengaged position to the engaged position moves the lock ring to engage the least one lock pin of the dome-shaped pressure chamber; and
    a second component removable from the first component, wherein the second component comprises an air compressor configured to provide compressed air to the dome-shaped pressure chamber.

13. The pressure forming machine of claim 12, wherein an edge of the dome-shaped pressure chamber comprises a flexible seal.

14. The pressure forming machine of claim 12, further comprising an additional heater and circuitry for running the ring heating element and the additional heater in parallel or in series depending on a detected amount of voltage.

15. The pressure forming machine of claim 12, wherein the dome-shaped pressure chamber and ring heating element move only vertically between the first and second positions, and wherein the pressure forming machine further comprises a piston configured to slow a movement of the dome-shaped pressure chamber from the first position to the second position.

16. A pressure forming machine comprising:
    a first component comprising:
      a base;
      a pressure chamber;
      a heater located inside the pressure chamber, wherein the pressure chamber and heater are movable together between a first position where the pressure chamber is positioned away from the base and a second position where the pressure chamber is positioned closer to the base;

a first locking element fixed to the pressure chamber and movable together with the pressure chamber between the first and second positions;

a second locking element removably positioned in the base; and a user input device movable between a disengaged position and an engaged position, wherein in the engaged position, the second locking element is engaged with the first locking element and is movable together with the pressure chamber as the pressure chamber moves from the first position to the second position; and a second component comprising an air compressor configured to provide compressed air to the pressure chamber, wherein the second base component is removable from the first base component.

17. The pressure forming machine of claim 16, further comprising a cable configured to provide the compressed air from the second component to the first component.

18. The pressure forming machine of claim 16, further comprising a cable configured to provide power between the first and second components.

* * * * *